UNITED STATES PATENT OFFICE.

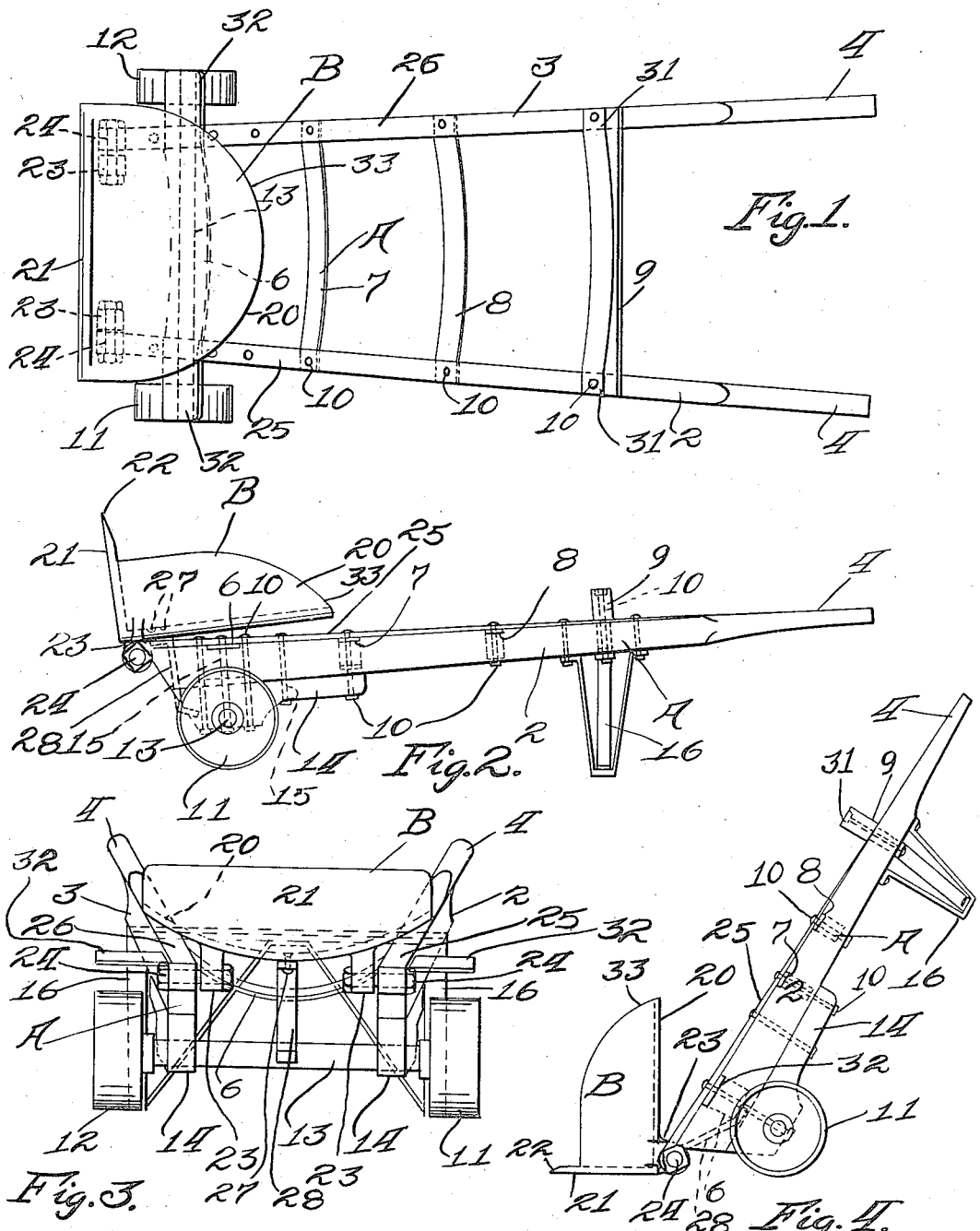

JOHN J. ROSS, OF INTERNATIONAL FALLS, MINNESOTA.

HAND-TRUCK.

1,150,539.  Specification of Letters Patent.  Patented Aug. 17, 1915.

Application filed April 12, 1915. Serial No. 20,743.

*To all whom it may concern:*

Be it known that I, JOHN J. ROSS, a citizen of the United States, residing at International Falls, in the county of Koochiching and State of Minnesota, have invented a new and useful Improvement in Hand-Trucks, of which the following is a specification.

This invention relates to improvements in hand trucks for use in the handling and transportation of merchandise, in and about paper mills, publishing houses, freight stations and similar places, the primary object being the production of a truck capable of withstanding rough usage, and particularly well suited for easily handling heavy and cumbersome paper rolls without damaging them.

Further objects and advantages will be apparent to persons skilled in the art to which the present invention relates.

In the accompanying drawing forming part of this specification, Figure 1 is a plan of my invention; Fig. 2 is a side elevation;
Fig. 3 is an end elevation, and Fig. 4 is another side elevation illustrating the loading cradle in position to engage and lift an article of merchandise on to the body of the truck.

A indicates the body of the truck, consisting of a pair of side or handle bars 2 and 3, shaped with handles 4 at their upper ends and increasing in depth toward the nose end of said body. These side bars are secured in laterally spaced position by intervening cross bars 6, 7, 8 and 9, all of which are secured, such as by bolts 10, to the side bars and curved downwardly between their ends to form a smooth curved inner floor surface, which tends to hold articles, such as rolls of papers, centrally between the side bars. The nose or lower end of the body of the truck is mounted upon a pair of truck wheels 11 and 12, by means of a shaft 13, upon which said wheels are journaled, said shaft being secured to a pair of wheel brackets 14. These wheel brackets are secured one to each side bar of the truck body by the bolts 15 and part of the bolts 10. Near the handle end of the truck body is a stand 16 of usual form, which supports that end of the truck, when lowered into substantially horizontal position.

Mounted upon the nose end of the truck body is a lifting cradle B having a transversely curved backwardly extending floor or back 20, and a flat transverse outwardly extending blade 21, the extremity of which is sharpened at 22. This lifting cradle is mounted on the body of the truck with its floor extending backwardly from the nose end a considerable distance, that illustrated being substantially one-third of the total length of the truck body, so as to engage a considerable portion of a roll of paper or other article of merchandise and support it without danger of the roll rolling sidewise. The floor of the cradle is formed with two downwardly extending journal bearing lugs 23, each of which is mounted upon a bolt shaft 24, each bolt shaft being in turn secured to one of the hinge straps 25 or 26. These hinge straps are secured to the upper edges of the side bars 2 and 3, by the same bolts 10 and 15, which fasten the cross bars and wheel brackets to the side bars.

Secured such as by bolts 27 to the floor of the lifting cradle is a depending stop arm 28 bent rearwardly at its lower end and adapted to strike by said lower end against the lower surface of the transverse bar 6 when the cradle is swung outwardly into the position illustrated in Fig. 4, thus limiting the outward tilting movement of the cradle to prevent the latter from turning below a predetermined degree in which it might otherwise impede the operation of the truck. When the cradle is tilted back in raised condition as illustrated in Fig. 2, its body is supported between the side bars and upon the forward cross bar 6. It will be noted that the cross bars 6, 7 and 8 are recessed into the side bars, so that the hinge straps 25 and 26 lie evenly on the upper edges of said bars. The cradle is made out of malleable iron, steel or other suitable material, and of sufficient strength to withstand rough usage. The rearward edge 33 of the body of the cradle is also gradually curved, although it will be understood that the shape of the cradle can be variously modified without departing from the principles of my invention.

In use the truck hereinbefore described is capable of loading articles of merchandise of all classes, but as before stated is particularly well adapted for handling newspaper stock in large and heavy cylindrical rolls, as it comes from paper mills, and in this use for example the loading cradle B is tilted down into the position illustrated in Fig. 4 and the blade 21 inserted below the lower end of a roll standing on end. The handle end of the truck is then tilted down about the fulcrum produced by the axis of the carrying wheels 11 and 12. During this tilting movement backwardly the stop 28 strikes against the lower surface of the cross bar 6, causing the cradle to lift the load and tilt it back until the roll rests within the concave surfaces of the cross bars. Owing to the comparatively long distance at which the lifting blade 21 and the floor 20 of the cradle extend from said hinge connection and to the broad surfaces of said parts, a roll of paper or other article forming the load is lifted by the loading cradle and placed securely upon the floor of the truck, without danger of rolling off of the truck and without mutilating the stock. Heretofore it has been customary to employ nose pieces upon trucks for loading and carrying paper rolls, but these nose pieces have presented surfaces of comparatively small extent, and have been rigidly secured on the body of the truck, thus constantly mutilating the stock constituting heavy rolls of paper and other articles of merchandise. My invention entirely overcomes this objection. Near the handle end of the body of the truck, the cross bar 9 has its ends extending upwardly above and mounted upon the upper edges of the side bar, so as to produce side guards 31 at both ends of the bar 9 and at both sides of the floor of the truck, which assists in preventing rolls of paper from slipping off of the bed. The ends of bar 6 also extend over the wheels 11 and 12 to form wheel guards 32.

In accordance with the patent statutes, I have described the principles of operation of my invention, together with the apparatus which I now consider to represent the best embodiment thereof, but I desire to have it understood, that the construction shown is only illustrative and that the invention can be carried out by other means and applied to uses other than those above set forth within the scope of the following claims.

Having described my invention, what I claim as new and desire to protect by Letters Patent is:—

1. A hand truck, having a truck body in combination with a loading cradle, consisting of a concave back extending rearwardly over the floor of said body and a lifting blade across the lower end of said concave back, said loading cradle being hinged near its lower end upon the lower end of said truck body and a stop depending from the floor of said loading cradle and arranged to impinge against a portion of the truck body to limit the outward swinging movement of the loading cradle.

2. In combination with a truck body having side bars and transverse bars curved downwardly between said side bars to form a concave floor surface, a loading cradle hinged upon the lower end of said truck body having a concave rearwardly extending cradle back and an outwardly extending loading blade, said cradle back being arranged to tilt backwardly toward the floor of said body between said side bars and a stop depending from said cradle back and adapted to impinge against a portion of the truck body to limit the forward tilting movement of said loading cradle.

3. A hand truck, having a truck body in combination with a loading cradle, consisting of a concave back extending rearwardly over the floor of said body and a lifting blade across the lower end of said concave back, said cradle being tiltingly mounted upon the lower end of said body to swing outwardly and means for limiting the outwardly swinging movement of said cradle.

In testimony whereof, I have signed my name to this specification, in the presence of two subscribing witnesses.

JOHN J. ROSS.

Witnesses:
N. L. OLSON,
PAUL H. KRUPOCTS.